United States Patent
Kuo et al.

(10) Patent No.: US 7,256,226 B2
(45) Date of Patent: Aug. 14, 2007

(54) STORAGE-STABLE ACRYLATE-FUNCTIONAL ALKYD RESIN COMPOSITIONS

(75) Inventors: Thauming Kuo, Kingsport, TN (US); Kimberley Carmenia Carico, Kingsport, TN (US); Rebecca Reid Stockl, Kingsport, TN (US); Don Leon Morris, Kingsport, TN (US); Kevin Jude O'Callaghan, Kingsport, TN (US)

(73) Assignee: Hexion Specialty Chemicals, Inc., Columbus, OH (US)

( * ) Notice: Subject to any disclaimer, the term of this patent is extended or adjusted under 35 U.S.C. 154(b) by 546 days.

(21) Appl. No.: 10/800,841

(22) Filed: Mar. 15, 2004

(65) Prior Publication Data

US 2005/0203218 A1 Sep. 15, 2005

(51) Int. Cl.
*C08K 5/37* (2006.01)
*C08F 290/06* (2006.01)

(52) U.S. Cl. .................... 523/507; 524/81; 524/504

(58) Field of Classification Search .............. 523/507; 524/81, 504

See application file for complete search history.

(56) References Cited

U.S. PATENT DOCUMENTS

| | | | |
|---|---|---|---|
| 3,434,987 A | 3/1969 | Dhein et al. |
| 3,440,193 A | 4/1969 | Campagna |
| 3,494,882 A | 2/1970 | Andrews |
| 3,549,577 A | 12/1970 | Stromberg |
| 3,666,698 A | 5/1972 | Harris et al. |
| 3,699,066 A | 10/1972 | Hunsucker |
| 3,932,562 A | 1/1976 | Takahashi |
| 4,016,332 A | 4/1977 | Anderson et al. |
| 4,116,903 A | 9/1978 | Lietz et al. |
| 4,234,466 A | 11/1980 | Takahashi et al. |
| 4,517,322 A | 5/1985 | Birkmeyer et al. |
| 4,571,420 A | 2/1986 | Marks |
| 4,973,656 A | 11/1990 | Blount |
| 4,983,716 A | 1/1991 | Rao et al. |
| 5,218,042 A | 6/1993 | Kuo et al. |
| 5,340,871 A | 8/1994 | Pearson et al. |
| 5,348,992 A | 9/1994 | Pearson et al. |
| 5,349,026 A | 9/1994 | Emmons et al. |
| 5,371,148 A | 12/1994 | Taylor et al. |
| 5,378,757 A | 1/1995 | Blount, Jr. et al. |
| 5,530,059 A | 6/1996 | Blount, Jr. et al. |
| 6,051,633 A | 4/2000 | Tomko et al. |
| 6,476,183 B2 | 11/2002 | Bakkeren et al. |
| 6,534,598 B2 | 3/2003 | Kuo et al. |
| 6,548,601 B1 | 4/2003 | Kuo et al. |

FOREIGN PATENT DOCUMENTS

| JP | 48085628 | 11/1973 |
|---|---|---|
| JP | 2075669 | 3/1990 |

OTHER PUBLICATIONS

U.S. Appl. No. 10/121,927, filed Apr. 12, 2002, Kuo et al.
U.S. Appl. No. 10/121,396, filed Apr. 12, 2002, Kuo et al.
U.S. Appl. No. 10/356,286, filed Jan. 31, 2003, He.
*Resins for Surface Coatings*, vol. 1, p. 127, ed. by P.K.T. Oldring and G. Hayward, SITA Technology, London, UK, 1987.
*Resins for Surface Coatings*, vol. 1, p. 127-177, ed. by P.K.T. Oldring and G. Hayward, SITA Technology, London, UK, 1987.
*Resins for Surface Coatings*, vol. 1, pp. 181 *et seq.*, ed., by P.K.T. Oldring and G. Hayward, SITA Technology, London, Uk, 1987.
*Handbook of Coatings Additives*, pp. 496-506, ed. by L. J. Calbo, Marcel Dekker, Inc., New York, New York, 1987.

*Primary Examiner*—Tae H Yoon

(57) ABSTRACT

Storage-stable acrylate-functional alkyd resin compositions are disclosed that include an acrylate-functional alkyd resin and a monofunctional mercaptan such as a chain transfer agent. The compositions disclosed exhibit excellent stability on storage, and have utility as binders for coating compositions useful as low VOC, quick dry paints.

53 Claims, No Drawings

STORAGE-STABLE ACRYLATE-FUNCTIONAL ALKYD RESIN COMPOSITIONS

FIELD OF THE INVENTION

This invention relates to coating compositions, and more specifically, to storage-stable acrylate-functional alkyd resin compositions.

BACKGROUND OF THE INVENTION

In recent years, considerable efforts have been made by the coatings industry to develop coating formulations containing little or no volatile organic compound (VOC) content. Regulations to limit the amount of VOC content of industrial coatings have encouraged research and development to explore new technologies directed at reducing solvent emissions from industrial solvent-based coatings operations used to coat such products as automotive parts, appliances, general metal products, furniture, and the like. However, while the move to reduced organic solvent-based compositions brings health and safety benefits, these lower VOC content coating compositions must still meet or exceed the performance standards expected from solvent-based compositions.

Alkyd resins are one of the most common binders used for ambient-cure, solvent-based coatings. The resistance properties of traditional solvent-borne alkyd resins are developed via autooxidative crosslinking of the alkyd film. Crosslinking occurs when the activated methylene groups in the unsaturated fatty acids or oils of the alkyd are oxidized in air to give hydroperoxides, which subsequently decompose to generate free radicals, resulting in oxidative crosslinking. This oxidative crosslinking process is commonly accelerated by adding driers, such as, for example, various salts of cobalt, zirconium, calcium, and manganese. However, while alkyd resins have shown, and continue to show, promise, they have relatively slow "dry" and/or cure times, particularly at ambient temperatures. Various modifications have been made to alkyd resins to address such concerns.

One such attempt includes polymerization of an alkyd resin with a vinyl compound, such as styrene or methyl methacrylate, via a free-radical reaction, to produce a vinyl-alkyd copolymer or a vinyl alkyd. Vinyl alkyd resins generally have a higher molecular weight and a higher Tg, producing coatings with reduced tack-free time (via solvent evaporation). However, the through-dry time (oxidation of the film) of such coatings is longer due to the decreased degree of unsaturation in the alkyd as a result of copolymerization with the vinyl compound. This problem is described in further detail in Resins for Surface Coatings, Vol. 1, pp. 181 et seq., ed. by P. K. T. Oldring and G. Hayward, SITA Technology, London, UK, 1987, which is incorporated herein by reference. An additional drawback is that paint formulations containing vinyl alkyd resins require greater amounts of solvent, due to the increased molecular weight and Tg of the vinyl alkyd.

JP 48085628 (hereinafter JP '628) describes light-curable coating compositions made from a drying oil-modified alkyd resin which is further modified using glycidyl acrylate, glycidyl methacrylate, or its derivative. In this reference, drying oil-modified alkyd resins having carboxyl groups and an oil length of 20-80 are treated with glycidyl acrylate, glycidyl methacrylate, or its derivative, in the presence of a polymerization inhibitor. In a specific embodiment, a drying oil-modified alkyd resin having an acid number of 100 and an oil length of 34 is reacted with 36 parts glycidyl methacrylate, to give a resin varnish having an acid number of 5.0.

The formulations are made by a process in which hydroquinone, a polymerization inhibitor, is used in the reaction mixture, to prevent the alkyd from gelling during resin synthesis. A drawback of this approach is that the presence of a polymerization inhibitor in paint formulations is known to prolong the drying times of the resulting coating films.

U.S. Pat. Nos. 6,534,598 and 6,548,601 disclose ambient oxidative-cure compositions based on acrylate-functionalized alkyd resins. These ambient oxidative-cure compositions may be used, for example, in fast drying, high solid paint or enamel compositions or formulations. However, we have found these acrylate-functionalized alkyd resins to be less storage-stable than commercial applications demand. Their viscosity and molecular weights tend to increase over time. As a result, paint formulation becomes difficult and the resulting coating properties are inconsistent.

U.S. patent application Ser. Nos. 10/121,927 and 10/121,396, filed Apr. 12, 2002 and presently pending, likewise disclose ambient oxidative-cure compositions that include an acrylate-functionalized alkyd resin. U.S. patent application Ser. No. 10/356,286, filed Jan. 31, 2003 and presently pending, discloses acrylate-functional alkyd coating compositions that exhibit improved dry time.

U.S. Pat. No. 4,571,420 discloses a composition comprising an acrylic polymer backbone having pendant unsaturation, at least about 0.3 equivalent of polyfunctional mercaptans per equivalent of unsaturation, and 0.001 to about 0.15 wt. % vanadium compound. This reference teaches the utilization of about 0.3 to about 5 equivalents of a polyfunctional mercaptan as a crosslinker to react the pendant unsaturated groups in the acrylic polymer upon exposure to air.

U.S. Pat. No. 6,476,183 discloses a coating composition comprising an oxidatively drying polyunsaturated condensation product, such as an alkyd, having pendant groups comprising unsaturated carbon-carbon bonds; a polythiol having two or more —SH groups; and a siccative. This reference teaches the utilization of a polyfunctional thiol as a crosslinker, to improve the oxidative cure of an alkyd, thus requiring a polythiol having two or more —SH groups.

JP 2075669 describes a primer composition prepared by mixing an oxidation-curable alkyd resin, a dryer, a fat or oil, and/or a silane coupling agent. The alkyd resin may be a resin-modified or phenol-modified alkyd resin, the fat or oil may be a condensate of a natural unsaturated fat or oil or an unsaturated higher fatty acid with an alcohol, and the optional silane coupling agent may have an amino, mercapto, or epoxy group.

U.S. Pat. No. 4,016,332 discloses a polymer prepared by reacting a polyester or polyol with a mercaptan comprising a hydrocarbon chain of 1 to about 18 carbon atoms, and substituted with at least one carboxyl group, to form a mercapto-terminated reaction product, and reacting this product with one or more ethylenically unsaturated monomers in the presence of a peroxygen or azo catalyst to form the polymer. The mercapto-terminated reaction product may act as a chain transfer agent in the subsequent reaction with the ethylenically unsaturated monomer. The polyester can be oil-modified, an oil such as sunflower oil being employed in its preparation. The oil-modified polyester preferably contains 20-80 wt. %, more preferably, 30-65 wt. % of the oil component.

U.S. Pat. No. 4,116,903 discloses a storage-stable emulsion that includes an interpolymer containing about 5-90 wt.

% of a preformed water-soluble alkyd resin, the balance being at least one in situ emulsion polymerized vinyl monomer. Preferred vinyl monomers include styrene and acrylic and methacrylic esters. The product interpolymer contains, on a 100 wt. % total non-volatile solids basis, preferably 5-90 wt. %, more preferably 15-50 wt. %, typically 25-50 wt. % alkyd resin, the balance being in situ polymerized vinyl monomer. Other materials that can be present at the time of or during emulsion polymerization include chain transfer agents such as n-octyl mercaptan or t-dodecyl mercaptan.

U.S. Pat. No. 3,932,562 discloses a process for producing a resin that comprises graft polymerizing by chain transfer onto a mercapto group-containing alkyd resin one or more ethylenically unsaturated polymerizable compounds in a weight ratio of 5:95 to 70:30, preferably 10:90 to 60:40. The ethylenically unsaturated compounds are selected from a large group of monomers that includes glycidyl carboxylates. The mercapto group-containing alkyd resin can be formed by introducing a mercapto group into the alkyd resin molecule either in the course of or after the preparation of the alkyd resin, but prior to the chain transfer reaction with the one or more ethylenically unsaturated compounds.

U.S. Pat. No. 4,234,466 discloses a process for preparing a solid pigment spherical particle dispersion that comprises: subjecting to suspension or bulk polymerization in the presence of a suspension stabilizer a liquid composition comprising at least one ethylenically unsaturated polymerizable compound selected from a group that includes glycidyl vinyl compounds such as glycidyl methacrylate, at least one resin selected from a group that includes alkyd resins having at least one mercapto group to be grafted with the ethylenically unsaturated compound, and at least one pigment. The polymerization can be carried out in the presence of a chain transfer agent such as a mercaptan, for example, t-dodecyl mercaptan. The ethylenically unsaturated polymerizable compound and the resin containing at least one mercapto group are used in amounts of, respectively, 27-96 wt. % and 3-60 wt. % on the basis of the weight of the liquid composition.

U.S. Pat. No. 4,517,322 discloses a non-gelled resin formed by reacting in an aqueous medium an ethylenically unsaturated polyester having an ethylenically unsaturated component containing two carboxylic acid moieties with ethylenically unsaturated monomers that include an ethylenically unsaturated carboxylic acid. Relative to the total weight of the non-gelled resin, the ethylenically unsaturated polyester and the ethylenically unsaturated monomers are reacted in amounts of, respectively, about 90-30 wt. %, preferably about 80-35 wt. %, and about 10-70 wt. %, preferably about 20-65 wt. %. The ethylenically unsaturated polyester can be an alkyd resin prepared in the presence of a drying, semi-drying, or non-drying oil or fatty acid. The ethylenically unsaturated carboxylic acid can be combined with another monomer such as styrene or an acrylic or methacrylic ester. In illustrative Example 1-B, the reaction of the ethylenically unsaturated polyester and the ethylenically unsaturated monomers is carried out in butyl cellosolve in the presence of the chain transfer agent mercaptoethanol.

U.S. Pat. No. 4,983,716 discloses a process for producing a non-aqueous dispersion of addition polymers in an alkyd medium that comprises: forming an alkyd having a non-volatile content greater than about 75% by reacting a triglyceride oil with a trifunctional carboxylic acid or anhydride, and then reacting the resulting product with a trifunctional alcohol or a mixture of tri- and di-functional alcohols to form the alkyd. One or more monomers are polymerized in the presence of the alkyd by a free radical mechanism. The triglyceride oil can be sunflower oil, and the trifunctional acid or anhydride can be trimellitic acid or anhydride. The monomer is selected from a group of compounds that includes multifunctional epoxides. The polymerization mixture contains alkyd and polymerizable monomers in amounts of, respectively, 25-99 wt. %, preferably 30-60 wt. %, most preferably, 40-55 wt. %, and 1-75 wt. %, preferably 40-70 wt. %, most preferably, 45-60 wt. %. According to the '716 patent, a chain transfer agent such as methyl mercaptopropionate or 2-mercaptoethanol is added to the polymerization mixture in an amount of from about 0.1-6.0 wt. % of the monomer.

U.S. Pat. Nos. 5,340,871 and 5,348,992 contain similar disclosures pertaining to aerosol compositions containing non-aqueous dispersions of addition polymers in alkyd media. The non-aqueous dispersion preferably comprises the reaction product of two or more monomers, at least one of which has hydroxy functionality, and the polymerization is carried out in the presence of a chain transfer agent selected from the group consisting of methyl mercaptopropionate, dodecyl mercaptan, and 2-mercaptoethanol. The polymerization mixture contains alkyd and polymerizable monomers in amounts of, respectively, about 35-75 wt. %, preferably about 40-60 wt. %, and about 65-25 wt. %, preferably about 60-40 wt. %. The alkyds are typically formed from triglyceride oils or fatty acids thereof, for example, sunflower oil. Other starting materials include multifunctional alcohols such as pentaerythritol and multifunctional carboxylic acids or anhydrides such as phthalic acid and trimellitic acid.

U.S. Pat. No. 6,051,633 discloses a process for producing an air-dry alkyd-stabilized non-aqueous dispersion of addition polymers in an alkyd medium. The polymerization is carried out in the alkyd medium via a free radical addition mechanism in the presence of a mercaptan-containing chain transfer agent that preferably is selected from the group consisting of methyl mercaptopropionate, dodecyl mercaptan, and 2-mercaptoethanol. The polymerization mixture contains alkyd and polymerizable monomers in amounts of, respectively, about 25-75 wt. %, preferably about 40-60 wt. %, and about 75-25 wt. %, preferably about 60-40 wt. %. There remains a need in the art for an acrylate-functional alkyd resin that is storage-stable and commercially viable for ambient oxidative-cure, fast-dry coatings having low VOC.

BRIEF SUMMARY OF THE INVENTION

In one embodiment, the invention relates to alkyd resin compositions that include an acrylate-functional alkyd resin; and from about 100 ppm to about 2000 ppm, based on the acrylate-functional alkyd resin, of a monofunctional mercaptan.

In another embodiment, the invention relates to methods of improving the storage stability of acrylate-functional alkyd resin compositions, the methods comprising adding to the resin composition from about 100 ppm to about 2000 ppm, based on the acrylate-functional alkyd resin, of a monofunctional mercaptan.

In yet another embodiment, the invention relates to methods of preparing storage-stable acrylate-functional alkyd resin compositions, that include the steps of reacting (i) a carboxyl-functional alkyd resin, and (ii) a glycidyl acrylate, wherein the glycidyl moiety of the glycidyl acrylate is the reactive moiety and the reaction product contains terminal reactive acrylate moieties, to obtain an acrylate-functional alkyd resin; and adding to the acrylate-functional alkyd resin: at least one drier, a solvent, and from about 100 ppm to about 2000 ppm, based on the acrylate-functional alkyd resin, of a monofunctional mercaptan, to obtain the storage-stable acrylate-functional alkyd resin composition.

Additional embodiments of the invention are further described below.

DETAILED DESCRIPTION OF THE INVENTION

The present invention may be understood more readily by reference to the following detailed description of the invention, and to the Examples included therein.

Before the present compositions of matter and methods are disclosed and described, it is to be understood that this invention is not limited to specific synthetic methods or to particular formulations, unless otherwise indicated, and, as such, may vary from the disclosure. It is also to be understood that the terminology used is for the purpose of describing particular embodiments only, and is not intended to limit the scope of the invention.

The singular forms "a," "an," and "the" include plural referents, unless the context clearly dictates otherwise.

Optional or optionally means that the subsequently described event or circumstances may or may not occur. The description includes instances where the event or circumstance occurs, and instances where it does not occur.

Ranges may be expressed herein as from about one particular value, and/or to about another particular value. When such a range is expressed, it is to be understood that another embodiment is from the one particular value and/or to the other particular value.

Throughout this application, where patents or publications are referenced, the disclosures of these references in their entireties are intended to be incorporated by reference into this application, in order to more fully describe the state of the art to which the invention pertains.

This invention relates to storage-stable acrylate-functional alkyd resin compositions. More specifically, the invention relates to alkyd resin compositions comprising an acrylate-functionalized alkyd resin, and a monofunctional mercaptan (a mercaptan having a single thiol group), such as those commonly used as chain transfer agents. By the term "monofunctional" we mean that the mercaptan has a single thiol group, in the presence or the absence of additional functionality other than thiol functionality. The use of a monofunctional mercaptan, such as a monofunctional mercaptan chain transfer agent, results in a composition that exhibits excellent stability on storage, and therefore, is commercially useful for coating applications. In particular, the alkyd resin of this invention has utility as a binder for low VOC, quick dry paints.

This invention provides a solution to eliminate the storage-stability problem associated with acrylate-functional alkyd resins. Without proper stabilization, these acrylate-functional resins are found to exhibit a rise in viscosity and molecular weight over time, believed to be caused by the reactive acrylate functional groups. In order to be commercially viable, not only is it necessary to stabilize the resins, it is also necessary for the resulting coatings to have adequate dry times. Achieving these two goals is particularly challenging, since an additive capable of stabilizing the acrylate functionality in the resin would also be expected to deactivate the curing mechanism provided by the acrylate functionality, resulting in increased dry times.

Surprisingly, we have found that the use of monofunctional mercaptans, such as mercaptan chain transfer agents (CTAs), results in a relatively stable viscosity and molecular weight over time, without causing detrimental effects on the dry times of the coating films, when used in suitable amounts. We were further surprised to find that isooctyl 3-mercaptopropionate (IOMP) provided excellent resin stability, among the mercaptans evaluated.

Thus, in one embodiment, this invention provides a storage-stable alkyd resin composition comprising:

(I) an acrylate-functional alkyd resin; and (II) from about 100 ppm to about 2,000 ppm, based on (I), of a monofunctional mercaptan.

Examples of the monofunctional mercaptans useful according to the invention include those used as chain transfer agents (monothiols, or compounds having one SH functionality), such as isooctyl 3-mercaptopropionate (IOMP), n-dodecyl mercaptan (DDM), t-dodecyl mercaptan, n-octyl mercaptan, t-octyl mercaptan, sec-octyl mercaptan, n-tetradecyl mercaptan, n-octadecyl mercaptan, n-hexyl mercaptan, n-amyl mercaptan, n-butyl mercaptan, t-butyl mercaptan, n-butyl 3-mercaptopropionate (BMP), methyl 3-mercaptopropionate, and the like, as well as mixtures thereof.

Especially suitable mercaptans include IOMP, DDM, and BMP; a preferred mercaptan is IOMP.

In some embodiments, the monofunctional mercaptans may contain no other functionality, for example no silane functionality, or no amino functionality, or no epoxy functionality, or no carboxyl functionality, or no hydroxyl functionality, or no ester functionality. In other embodiments, however, the monofunctional mercaptan may be further functionalized. This further functionalization may, or may not be, reactive.

In one embodiment, the compositions according to the invention are provided with substantially no polyfunctional mercaptans, that is, the compositions contain substantially no mercaptans having more than one thiol group per molecule.

Suitable amounts of monofunctional mercaptan in the resin composition of the present invention may be from about 100 ppm to about 2,000 ppm, or from about 200 ppm to about 1000 ppm, or from about 300 ppm to about 600 ppm, with respect to the acrylate-functional alkyd resin.

Because mercaptans are known to be reactive toward oxirane groups under certain conditions, it may be necessary in some instances to take into account any residual (unreacted) glycidyl acrylate in the acrylate-functional alkyd resin when determining the amount of the mercaptan needed for mixing, in order to obtain the desired amount of monofunctional mercaptan in the final resin composition. We have measured residual glycidyl acrylate levels in some embodiments of the invention, as further described in the examples, and have not detected any appreciable change in glycidyl acrylate content upon addition of increasing amounts of monofunctional mercaptan. It remains a possibility, however, that under certain conditions of use the monofunctional mercaptan may react with oxirane groups or other reactive groups present in the resin composition, requiring the formulator to add amounts of monofunctional mercaptan greater than would otherwise be required in the absence of such reaction.

The acrylate-functional alkyd resin may comprise the reaction product of (i) a carboxyl-functional alkyd resin and (ii) a glycidyl acrylate, the glycidyl moiety of the glycidyl acrylate being the reactive moiety to functionalize the alkyd resin. The resulting reaction product contains pendant reactive acrylate moieties.

The acrylate-functional alkyd resin may also be obtained via other reaction schemes, that is, other sources of acrylate, methacrylate, and vinyl functionality are also suitable for use according to the invention. Thus, an epoxide group is not strictly necessary in the acrylate, so long as some means for appending the acrylate or vinyl group to the alkyd resin is available, which means preserves the acrylate or vinyl functionality. Suitable acrylates for functionalizing the alkyd resin thus include tert-butyl acrylate, tert-butyl methacrylate, methyl acrylate, methyl methacrylate, n-butyl acrylate, n-butyl methacrylate, 4-hydroxybutyl (meth)acrylate, 2-hydroxyethyl (meth)acrylate, acrylic acid, methacrylic acid, and the like. These esters or acids may be incorporated into the alkyd resin by such means as transesterification or esterification. Suitable allylic compounds include allyl glycidyl ether, and epoxybutene, which may be incorporated into the alkyd resin by ring opening of the epoxide. Suitable vinyl compounds include 3-isopropenyl-alpha,alpha-dimethylbenzyl isocyanate, vinyl alcohol, vinyl esters, and the like, which may be incorporated into the alkyd resin, for example, by urethane formation, esterification, or transesterification.

In another embodiment, the acrylate-functional alkyd resin comprises the reaction product of: (i) about 85 to about 98 wt % of a carboxyl-functional alkyd resin, and (ii) about 2 to about 15 wt % of a glycidyl acrylate, each as described herein, wherein the weight percents are based on the total weight of (i) and (ii). Alternatively, the glycidyl acrylate may be provided in an amount of from about 4 to about 8 wt %, again based on the total weight of (i) and (ii).

A carboxyl-functional alkyd resin may be any alkyd resin containing carboxyl functionality, in addition to hydroxyl functionality, as known in the art. The carboxyl-functional alkyd may be prepared by reacting a diol, a polyol, a polycid, a monofunctional acid, and a fatty acid, fatty ester, or naturally occurring-partially saponified oil, optionally in the presence of a catalyst. Thus, a carboxyl-functional alkyd resin may be the reaction product of: (a) 0 to about 30 mole % of a diol, (b) about 10 to about 40 mole % of a polyol, (c) about 20 to about 40 mole % of a polyacid, (d) 0 to about 10 mole % of a monofunctional acid, (e) about 10 to about 60 mole % of a fatty acid, fatty ester, or naturally occurring oil, and, optionally, (f) a catalyst, wherein the mole percents are based on the total moles of (a), (b), (c), (d), (e) and (f) if present. Suitable examples of each of the components of the hydroxyl-functional alkyd resin include those known in the art including, but not limited to, those discussed below, and in *Resins for Surface Coatings*, Vol. 1, p. 127, ed. by P. K. T. Oldring and G. Hayward, SITA Technology, London, UK.

The fatty acid, fatty ester, or naturally occurring, partially-saponified oil may be any fatty acid, fatty ester, or naturally occurring-partially saponified oil known in the art and used in the formation of an alkyd resin. In one embodiment, at least one monobasic fatty acid, fatty ester, or naturally occurring, partially-saponified oil is used and selected from the following formulae (I), (II) and (III):

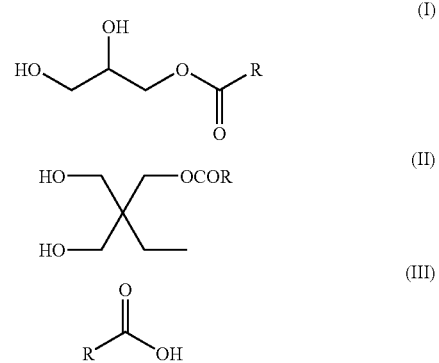

In formulae (I), (II) and (III), R is a saturated or unsaturated $C_8$-$C_{20}$ alkyl group. More preferably, R is one of the following unsaturated $C_{17}$ alkyl groups:

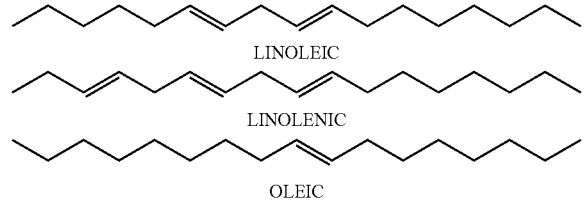

In another embodiment, the monobasic fatty acid or fatty ester oil may be prepared by reacting an oil or a fatty acid with a polyol. Examples of suitable oils include sunflower oil, canola oil, dehydrated castor oil, coconut oil, corn oil, cottonseed oil, fish oil, linseed oil, oiticica oil, soya oil, tung oil, animal grease, castor oil, lard, palm kernel oil, peanut oil, perilla oil, safflower oil, tallow oil, walnut oil, and the like. Suitable examples of fatty acids, alone or as components of oil, include, but are not limited to, tallow acid, soya acid, myristic acid, linseed acid, crotonic acid, versatic acid, coconut acid, tall oil fatty acid (e.g., PAMOLYN 200, commercially available from Eastman Chemical Co.), rosin acid, neodecanoic acid, neopentanoic acid, isostearic acid, 12-hydroxystearic acid, cottonseed acid, and the like.

The polyol used in the preparation of the alkyd resin itself, or the monobasic fatty acid or fatty ester, is preferably selected from aliphatic, alicyclic, and aryl alkyl polyols. Suitable examples of polyols include, but are not limited to, trimethylolpropane (TMP), pentaerythritol (PE), trimethylolethane, erythritol, threitol, dipentaerythritol, sorbitol, glycerine, and the like. Preferably, the polyol is trimethylolpropane (TMP) or pentaerythritol (PE).

In addition to the polyol, a diol may be used in the preparation of the alkyd resin. Examples of suitable diols include, but are not limited to, neopentyl glycol (NPG), ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, and hydrogenated bisphenol A. An especially suitable diol is neopentyl glycol (NPG).

The polyacid (dicarboxylic acid or tricarboxylic acid) and monofunctional acid (monocarboxylic acid) components of the alkyd resin may be any polyacid or monofunctional acid known in the art and used in the formation of an alkyd resin. Suitable dicarboxylic acids include, for example, isophthalic acid, phthalic anhydride (acid), terephthalic acid, adipic acid, tetrachlorophthalic anhydride, dodecanedioic acid, sebacic acid, azelaic acid, 1,4-cyclohexanedicarboxylic acid, 1,3-cyclohexanedicarboxylic acid, hexahydrophthalic anhydride, tetrahydrophthalic anhydride, maleic anhydride, fumaric acid, succinic anhydride, succinic acid, 2,6-naphthalenedicarboxylic acid or glutaric acid, and the like. Especially suitable dicarboxylic acids include isophthalic acid, phthalic anhydride, or phthalic acid. Suitable tricarboxylic acids include, for example, trimellitic anhydride. A monofunctional acid may also be used, such as, for example, benzoic acid, acetic acid, propionic acid, t-butylbenzoic acid, and butanoic acid.

A suitable glycidyl acrylate may be any substituted or unsubstituted acrylate containing an epoxide or glycidyl moiety that, upon reaction with a carboxyl-functional alkyd resin, will produce an acrylate-functional alkyd resin capable of effecting crosslinking during the curing process, each as described above. According to this aspect, upon reaction with a carboxyl-functional alkyd resin, the glycidyl moiety of the glycidyl acrylate exhibits greater reactivity than the acrylate moiety, i.e., it is the glycidyl moiety which undergoes reaction with the carboxyl-functional alkyd resin. Suitable substituents for the acrylate portion of the glycidyl acrylate include $C_1$-$C_{18}$ alkyl groups to form classes of compounds, such as, for example, alkylacrylates (e.g., methacrylates) and crotonates. An especially suitable glycidyl acrylate is glycidyl methacrylate.

Optionally, a catalyst may be used to promote the formation of an alkyd resin. The catalyst may be any catalyst known in the art used in the formation of an alkyd resin. Especially suitable catalysts include acid catalysts, such as, for example, FASCAT 4100 and FASCAT 4350 (available from ATOFINA). The amount of catalyst added promotes the formation of an alkyd resin, as described above, and may be determined by routine experimentation as understood by those skilled in the art. Preferably, a catalyst is added in amounts ranging from about 0.01-1.00 wt % based on the amount of reactants.

A carboxyl-functional alkyd resin may be prepared at a temperature range of about 170° C. to about 250° C., or from about 180° C. to about 245° C., or from about 190° C. to about 240° C. The carboxyl-functional alkyd resin may have a hydroxyl number from about 30 to about 180 mg KOH/g, an acid number from about 5 to about 100 mg KOH/g, a number average molecular weight (Mn) from about 700 to about 4000, and a weight average molecular weight (Mw) from about 6,000 to about 50,000.

In another embodiment of the invention, the carboxyl-functional alkyd resin further comprises a residue of about 2 to about 10 mol % of a sulfomonomer. The sulfomonomer, and especially a difunctional sulfomonomer, is utilized to promote water dispersibility, and may be a diacid or derivative thereof, containing an —$SO_3M$ group. Suitable difunctional sulfomonomers are described in U.S. Pat. Nos. 4,973, 656, 5,218,042, and 5,378,757, incorporated herein by reference. The metal ion of the sulfonate salt group may be $Na^+$, $Li^+$, $K^+$, $Mg^{2+}$, $Ca^{2+}$, $Cu^{2+}$, $Fe^{2+}$, or $Fe^{3+}$. In one aspect, the metal ion is a monovalent cation.

The —$SO_3M$ group may be attached to an aromatic nucleus, examples of which include, but are not limited to, benzene, naphthalene, anthracene, diphenyl, oxydiphenyl, sulfonyldiphenyl, and methylenediphenyl. For example, the difunctional monomer may be a sodium salt of a sulfoterephthalic acid, 5-sulfoisophthalic acid, sulfophthalic acid, 4-sulfonaphthalene-2,7-dicarboxylic acid, dimethyl 5-sulfoisophthalic acid, or a derivative of such acids. Suitably, the difunctional sulfomonomer is 5-(sodiosulfo)-isophthalic acid, 5-(lithiosulfo)-isophthalic acid, or methyl esters thereof. An especially suitable difunctional sulfomonomer is 5-(sodiosulfo)-isophthalic acid (SIP).

The SIP-containing alkyd may be prepared by pre-reacting NPG and SIP, at a temperature range from about 150° C. to about 190° C., followed by the reaction with other reactants. A preferred acid number of the SIP-containing alkyd resin is from about 3 to about 50 mg KOH/g.

In a further embodiment, there is provided an ambient oxidative-cure coating composition comprising:
(a) a storage-stable alkyd resin composition comprising
 (I) an acrylate-functional alkyd resin, and
 (II) from about 100 ppm to about 2000 ppm, based on (I), of a monofunctional mercaptan such as a chain transfer agent;
(b) at least one drier; and
(c) a solvent selected from the group consisting of an organic solvent, water, and mixtures thereof.

In one embodiment of the coating composition just described, the storage-stable alkyd resin composition of (a) is present in an amount of from about 30 to about 98 wt %, based on the total composition; the drier of (b) is present in an amount of from about 0.01 to about 5.0 wt % of metal, based on the total composition; and the solvent of (c) is present in an amount of from about 1 to about 70 wt %, based on the total composition.

In various further embodiments, the acrylate-functional alkyd coating composition may include from 0.15 wt % to 5 wt % calcium metal content, or from 0.2 wt % to 2 wt % calcium metal content, or from 0.25 wt % to 1.1 wt % calcium metal content, based on the binder solids content; and at least 0.01 wt % cobalt metal content. The cobalt metal content may alternatively be at least 0.02 wt % cobalt metal content, or in a range of from 0.025 wt % to 0.15 wt % cobalt metal content, based on the binder solids content.

The drier may be any drier known in the art. Examples of suitable driers include, but are not limited to, various salts of cobalt, zirconium, calcium, zinc, lead, iron, cerium, aluminum, and manganese. An especially suitable drier is a cobalt drier. Mixtures of driers (i.e. a drier system) may also be used. The driers typically are used as octoates or naphthenates, in an amount of from 0.005-5.0 wt % metal, based on the alkyd resin. Examples of commercial products include Zirconium HEX-CEM, Cobalt TEN-CEM, Calcium CEM-ALL, Calcium TEN-CEM, Zirconium HYDRO-CEM, and Cobalt HYDRO-CURE II sold by OMG Americas of Westlake, Ohio. A description of metal driers, their functions, and methods for using them may be found, for example, in *Handbook of Coatings Additives*, p. 496-506, ed. by L. J. Calbo, Marcel Dekker, INC. New York, N.Y., 1987, which is incorporated by reference herein in its entirety.

The ambient oxidative-cure coating composition of the present invention may be solvent-based, in which the solvent content in the coating composition comprises one or more organic solvents. Examples of organic solvents include mineral spirits, benzene, xylene, vm&p naphtha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, trimethylpentanediol mono-isobutyrate, ethylene glycol mono-octyl ether, diacetone alcohol, TEXANOL® ester alcohol (Eastman Chemical Co.), and the like. These solvents may also include reactive solvents, such as, for example, diallyl phthalate, SANTOLINK XI-100® polyglycidyl allyl ether from Monsanto, and others as described in U.S. Pat. Nos. 5,349,026 and 5,371,148, which are incorporated herein by reference. An especially suitable organic solvent is mineral spirits. A solid content of greater than 70% is preferred in the solvent-based coating composition of the present invention.

In another embodiment, the ambient oxidative-cure coating composition of the present invention is water-based, in which the solvent content in the coating composition comprises water, and optionally one or more organic solvents. Preferred organic solvents are water-miscible, and include, but are not limited to, ethanol, n-propanol, isopropanol, n-butanol, sec-butanol, isobutanol, ethylene glycol, monobutyl ether, propylene glycol n-butyl ether, propylene glycol methyl ether, propylene glycol monopropyl ether, dipropylene glycol methyl ether, and diethylene glycol monobutyl ether.

To enhance water dispersibility, the coating composition of the invention may further comprise an amine, provided to neutralize the carboxyl groups in the acrylate-functional alkyd resin to yield ammonium salts, which are water dispersible. The amine may be present in an amount sufficient to neutralize 50-100% of the carboxyl groups in the acrylate-functional alkyd resin. A suitable acid number of an acrylate-functional alkyd resin before neutralization may be from about 40 to about 70 mg KOH/g. Typical amines include, but are not limited to, ammonia, trimethylamine, triethylamine, diethylamine, monoethanolamine, monoisopropanolamine, morpholine, ethanolamine, diethanolamine, N,N-dimethylethanolamine, N,N-diethylethanolamine, and N-methyldiethanolamine. In another aspect, amines may be replaced with inorganic bases such as, for example, potassium hydroxide, sodium hydroxide, and sodium carbonate provided that amine emission is undesirable.

When the acrylate-functional alkyd resin has a low acid number, such as from 0 to about 40, a surfactant may be added to effect the successful emulsification of the alkyd resin in water, with or without the use of an amine. The surfactant may also enhance water dispersibility. Suitable surfactants for alkyd emulsification may be anionic, cationic, or nonionic surfactants. Examples of anionic surfactants include alkali metal or ammonium salts of fatty acids; alkyl, aryl, or alkylaryl sulfonates, sulfates, and phosphates; and mixtures thereof. Examples of nonionic surfactants include alkyl and alkylarylpolydiol ethers, such as ethoxylation products of lauryl, oleyl and stearyl alcohols, and alkylphenol glycol ethers such as ethoxylation products of octylphenol or nonylphenol.

It is also possible to combine any of the methods described above to effect water dispersibility of the acrylate functional alkyd. These methods include incorporating sulfomonomers such as 5-(sodiosulfo)-isophthalic acid (SIP) into alkyd polymer chains, as further described, for example, in U.S. Pat. Nos. 5,530,059 and 5,378,757, incorporated herein by reference; neutralization, as further described, for example, in U.S. Pat. Nos. 3,666,698, 3,699,066, 3,549,577, 3,494,882 and 3,434,987; and surfactant emulsification, as further described, for example, in U.S. Pat. No. 3,440,193. Any two methods or all three methods may be used together to obtain the desired resin dispersion.

The coating composition of the invention may also comprise other resins, such as alkyd resins lacking acrylate functionality, for example in a weight ratio range from about 1:10 to about 10:1, respectively. Typical alkyd resins lacking acrylate functional that can be used in blend formulations include, but are not limited to, the conventional alkyds described in Resins for Surface Coatings, Vol. 1, pp. 127-177, ed. by P. K. T. Oldring and G. Hayward, SITA Technology, London, UK, 1987. Examples of such alkyds include those having the composition of: soya oil or soya oil fatty acid; pentaerythritol or glycerol; and phthalic anhydride or isophthalic acid. Blending with resins such as alkyd resins lacking acrylate functionality may be advantageous for reasons of cost, or to provide desirable rheological properties, or the like.

In certain embodiments of the invention, an ambient oxidative-cure coating composition, as described above, may also contain at least one pigment, to form an ambient oxidative-cure coating composition. Preferably, the pigment is present in an amount of about 30 to about 60 wt % based on the total weight of the composition. Examples of suitable pigments include those known in the art of surface coatings. For example, the pigment may be a typical organic or inorganic pigment, especially those set forth by the Colour Index, 3d Ed., 2d Rev., 1982, published by the Society of Dyers and Colourists in association with the American Association of Textile Chemists and Colorists, which document is incorporated herein by reference. Other examples of suitable pigments include, but are not limited to, titanium dioxide, barytes, clay, calcium carbonate, Barytes UF (Cimbar), CI Pigment White 6 (titanium dioxide), CI Pigment Red 101 (red iron oxide), CI Pigment Yellow 42, CI Pigment Blue 15, 15:1, 15:2, 15:3, 15:4 (copper phthalocyanines); CI Pigment Red 49:1, and CI Pigment Red 57:1. An especially suitable pigment is titanium oxide. Colorants such as, for example, phthalocyanine blue, molybdate orange, or carbon black may also be added to the ambient cure oxidative-cure coating composition.

The coating composition of the invention may be coated onto a substrate and cured using techniques known in the art (e.g., by spray-applying 3 to 4 mils of wet coating onto a metal panel and heating in a 150° C. forced air oven for 30 minutes). The substrate may be any common substrate, such as, for example, paper, polyester films such as polyethylene or polypropylene, metals such as aluminum or steel, glass, urethane elastomers, primed (painted) substrates, and the like. The coating composition of the invention may also be cured at room temperature (ambient cure).

The coating composition of the invention may further include one or more coating additives known in the art. Examples of suitable coating additives include, but are not limited to, leveling and flow control agents such as silicones, fluorocarbons, cellulosics, extenders, plasticizers, flatting agents, pigment wetting, and dispersing agents; ultraviolet (UV) absorbers; UV light stabilizers; defoaming and antifoaming agents; anti-settling, anti-sag and bodying agents; anti-skinning agents; anti-flooding and anti-floating agents; and corrosion inhibitors. Specific examples of such additives can be found in Raw Materials Index, published by the National Paint & Coatings Association, 1500 Rhode Island Avenue, N.W., Washington, D.C. 20005, incorporated herein by reference. Further examples of such additives may be found in U.S. Pat. No. 5,371,148, which is likewise incorporated herein by reference.

Examples of flatting agents include, but are not limited to, synthetic silica, available from the Davison Chemical Division of W. R. Grace & Company as SYLOID®; polypropylene, available from Hercules Inc., as HERCOFLAT®; and synthetic silicate, available from J. M. Huber Corporation, as ZEOLEX®.

Examples of dispersing agents include, but are not limited to, Yelkin TS Soya Lecithin (ADM Speciality), Nuosperse 657 (Condea Servo), sodium bis(tridecyl) sulfosuccinate, di(2-ethyl hexyl) sodium sulfosuccinate, sodium dihexylsulfosuccinate, sodium dicyclohexyl sulfosuccinate, diamyl sodium sulfosuccinate, sodium diisobutyl sulfosuccinate, disodium iso-decyl sulfosuccinate, disodium ethoxylated alcohol half ester of sulfosuccinic acid, disodium alkyl amido polyethoxy sulfosuccinate, tetra-sodium N-(1,2-dicarboxyethyl)-N-octadecyl sulfosuccinamate, disodium N-octasulfosuccinamate, sulfated ethoxylated nonylphenol, 2-amino-2-methyl-1-propanol, and the like.

Examples of viscosity, suspension, and flow control agents include, but are not limited to, Bentone SD-1 (ELEMENTIS), Irocthix 2000 (Lubrizol), polyaminoamide phosphate, high molecular weight carboxylic acid salts of polyamine amides, and alkylene amine salts of an unsaturated fatty acid, all available from BYK Chemie U.S.A. as ANTI TERRA®. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Several proprietary antifoaming agents are commercially available and include, but are not limited to, BUBREAK® of Buckman Laboratories Inc.; BYK® of BYK Chemie, U.S.A.; FOAMASTER® and NOPCO® of Henkel Corp./Coating Chemicals; DREWPLUS® of the Drew Industrial Division of Ashland Chemical Company; TRYSOL® and TROYKYD® of Troy Chemical Corporation, and SAG® of Union Carbide Corporation.

Examples of U.V. absorbers and U.V. light stabilizers include, but are not limited to, substituted benzophenone, substituted benzotriazoles, hindered amines, and hindered benzoates, available from American Cyanamid Company as CYASORB UV®, and diethyl-3-acetyl-4-hydroxy-benzylphosphonate, 4-dodecyloxy-2-hydroxy benzophenone, and resorcinol monobenzoate.

The acrylate-functional alkyd resin may be prepared by reacting a carboxyl-functional alkyd with a glycidyl acrylate. The acrylate-functional alkyd resin may also be prepared by first reacting a hydroxyl-functional alkyd resin with an acid anhydride to produce a carboxyl-functional alkyd resin, and reacting the carboxyl-functional alkyd resin with a glycidyl acrylate, to produce an acrylate-functional alkyd resin, as described above. The acrylate-functional alkyd resin may be prepared at a temperature range from about 100° C. to about 170° C., or from about 115° C. to about 165° C., or from about 125° C. to about 155° C. Optionally, a catalyst capable of promoting the reaction between oxirane and carboxyl functionalities may be used. An example of such a catalyst is Nacure XC-9206, available from King Industries.

The acrylate-functional alkyd resin may also be prepared by reacting an alkyd with alkyl (meth)acrylate or vinyl ester via transesterification at about 150 to about 230° C.; with (meth)acrylic acid, hydroxyalkyl (meth)acrylate, or vinyl alcohol via esterification at about 150 to about 230° C.; or by reacting an alkyd with an isocyanate having vinyl or acrylate functionality via urethane formation at about 25 to about 150° C. Suitable catalysts commonly used for such reactions may also be added.

Mercaptan chain transfer agents are typically added prior to or during addition polymerization reactions, also described as free radical polymerization reactions, to control the molecular weight of the addition polymer produced. Any mercaptan chain transfer agent remaining in such a polymerization reaction medium after polymerization is entirely incidental to its use in controlling the addition reaction. According to the invention, in contrast, the monofunctional mercaptans may be added after polymerization of the polymer (or binder), and it is desirable that the thiol group does not react during the addition process.

The storage-stable acrylate-functional alkyd resin of the invention may be prepared by mixing the monofunctional mercaptan (neat or in a solvent) with the acrylate-functional alkyd resin at room temperature, or at an elevated temperature such as, for example, from about 60° C. to about 130° C. The mixing is preferably carried out under an inert atmosphere to prevent the resin from oxidation and to prevent reaction between the thiol functionality of the mercaptan and the unsaturated groups of the alkyd.

Since the mercaptan is used in this invention to stabilize the acrylate-functional alkyd resin during storage, it is highly desirable that the mixing is carried out in the absence of any free-radical sources such as, for example, t-butylhydroperoxide, di-benzoyl peroxide, lauryl peroxide, di-tertiarybutylperoxide, 2,2'-azobisisobutyronitrile, benzoyl peroxide, hydrogen peroxide, ammonium persulfate, potassium persulfate, and sodium persulfate, all of which are commonly used as initiators for free-radical acrylic polymerizations and are capable of consuming the mercaptans during reactions.

This invention can be further illustrated by the following examples of preferred embodiments thereof, although it will be understood that these examples are included merely for purposes of illustration and are not intended to limit the scope of the invention unless otherwise specifically indicated.

EXAMPLES

Example 1

Synthesis of Acrylate-Functional Alkyd Resin 1

A base alkyd resin having an acid number of 23.4 mg KOH/g and 98% solids was prepared by reacting sunflower oil (2031.7 g), pentaerythritol (PE) (421.1 g), Pamolyn 200 (Eastman Chemical Co.) (549.1 g), phthalic anhydride (PA) (380.9 g), trimellitic anhydride (TMA) (211.0 g) in the presence of a refluxing solvent, xylene (67.4 g), and the catalyst Fascat 4350 (ATOFINA) (0.8 g) In the process, sunflower oil, PE, and the catalyst were first reacted in the alcoholysis step; followed by polycondensation with PA, Pamolyn 200, and TMA. Such processes are known in the art, as evidenced, for example, in U.S. Pat. Nos. 6,534,598 and 6,548,601, incorporated herein by reference, which contain further information in preparing such alkyd resins.

To a three-neck, round-bottom flask equipped with a mechanical stirrer, a water condenser, and a nitrogen inlet, were charged the above base alkyd resin (3200.0 g), glycidyl methacrylate (GMA) (180.6; 5.7% based on the base resin), and a catalyst, Nacure XC-9206 from King Industries, (3.2 g). The reaction mixture was stirred at 150-160° C. for 2 hours to yield a methacrylate-functional alkyd resin with an acid number of 4.6 mg KOH/g.

Example 2

Resin Stability Study Using Various Additives as Stabilizers

As listed in Table 1, various additives were added to the above acrylate-functional alkyd resin (200 g), at the specified ratios, and subsequently blended using a low-speed mixer. The samples were then stored in an oven at 50° C. The weight average molecular weight (Mw) (gel permeation chromatography method using polystyrene as the standard) and the Brookfield viscosity (Brookfield Viscometer, Brookfield Engineering Inc.) of each sample were determined over three weeks, and the results are listed in table 1.

TABLE 1

Resin Molecular Weights over Time at 50° C. with Various Stabilizers

| Stabilizer | Initial Mw | Mw after 1 wk at 50° C. | Mw after 2 wk at 50° C. | Mw after 3 wk at 50° C. |
|---|---|---|---|---|
| 0.1% IOMP | 11,043 | 11,249 | 11,470 | 11,399 |
| 0.5% TEA | 11,043 | 24,230 | 29,833 | 39,997 |
| 1.0% 2-Butanol | 11,043 | 33,005 | 63,877 | 115,811 |
| 500 ppm HQ | 11,043 | 19,661 | 31,755 | 43,161 |
| 500 ppm PBQ | 11,043 | 14,801 | 28,061 | 39,139 |
| 250 ppm HQ/250 ppm PBQ | 11,043 | 18,022 | 33,078 | 41,010 |
| 0.5% Tinuvin 292 | 11,043 | 35,293 | 54,431 | 99,044 |
| 0.5% Tinuvin 123 | 11,043 | 25,864 | 61,188 | 90,712 |
| 0.5% Irganox 1010 | 11,043 | 20,297 | 23,771 | 28,244 |
| None | 11,043 | 31,126 | 56,297 | 106,931 |

IOMP: isooctyl 3-mercaptopropionate
TEA: triethylamine
HQ: hydroquinone
PBQ: p-benzoquinone
Tinuvin 292 and Tinuvin 123: hindered amine light stabilizers (Ciba Specialty Chemicals)
Irganox 1010: antioxidant (Ciba Specialty Chemicals)

TABLE 2

Resin Viscosity over Time at 50° C. with Various Stabilizers

| Stabilizer | Initial Viscosity (cP) | Vis. after 1 wk at 50° C., (cP) | Vis. after 2 wk at 50° C., (cP) | Vis. after 3 wk at 50° C., (cP) |
|---|---|---|---|---|
| 0.1% IOMP | 9,800 | 6,800 | 8,410 | 7,400 |
| 0.5% TEA | 9,000 | 12,200 | 21,000 | 19,500 |
| 1.0% 2-Butanol | 7,150 | 9,100 | 20,300 | 26,000 |
| 500 ppm HQ* | 3,300 | 3,200 | 4,760 | 6,800 |
| 500 ppm PBQ* | 2,900 | 2,800 | 4,020 | 5,800 |
| 250 ppm HQ/250 ppm PBQ* | 3,000 | 3,200 | 4,130 | 5,400 |
| 0.5% Tinuvin 292 | 9,400 | 12,400 | 25,350 | 27,500 |
| 0.5% Tinuvin 123 | 9,300 | 11,400 | 26,350 | 35,500 |
| 0.5% Irganox 1010* | 3,250 | 3,500 | 4,500 | 9,000 |
| None | 8,300 | 10,400 | 27,000 | 37,500 |

*Added as 1% solution in n-butyl acetate, which resulted in lower initial viscosity.

As indicated in Tables 1 and 2, IOMP gave the best results of molecular weight and viscosity retention. It was also found that the inhibitors (HQ and PBQ), the hindered amine light stabilizers (Tinuvin 292 and Tinuvin 123), and the antioxidant (Irganox 1010) all had detrimental effects on the paint dry times—remained wet after eight hours or more.

Example 3

Resin Stability Study Using Mercaptans and Methyl Ethyl Ketoxime as Stabilizers

An additional stability study was carried out using a new batch of the acrylate-functional resin (2), prepared as in Example 1, and the stabilizers: IOMP, n-dodecyl mercaptan (DDM), and Exkin #2 from Condea Servo (methyl ethyl ketoxime). As indicated by the molecular weight and viscosity data in Tables 3 and 4, IOMP was the most effective stabilizer, DDM was partially effective, and Exkin #2 ineffective.

TABLE 3

Resin Molecular Weights over Time at 50° C. with Various Stabilizers

| Stabilizer | Initial Mw | Mw after 1 wk at 50° C. | Mw after 2 wk at 50° C. | Mw after 3 wk at 50° C. |
|---|---|---|---|---|
| 300 ppm IOMP | 10,347 | 5,776 | 10,237 | 12,891 |
| 300 ppm DDM | 10,347 | 13,216 | 21,847 | 37,791 |
| 0.5% Exkin #2 | 10,347 | 22,321 | 42,163 | 70,055 |
| None | 10,347 | 31,126 | 56,297 | N/A |

TABLE 4

Resin Viscosity over Time at 50° C. with Various Stabilizers

| Stabilizer | Initial Viscosity (cP) | Vis. after 1 wk at 50° C., (cP) | Vis. after 2 wk at 50° C., (cP) | Vis. after 3 wk at 50° C., (cP) |
|---|---|---|---|---|
| 300 ppm IOMP | 7,200 | 4,600 | 7,400 | 9,900 |
| 300 ppm DDM | 7,700 | 7,600 | 11,000 | 18,000 |
| 0.5% Exkin #2 | 7,900 | 9,600 | 19,400 | 28,000 |

Example 4

Resin Stability Study Using Various Levels of IOMP as the Stabilizer

An acrylate-functional alkyd resin (3) was prepared for this study according to the procedure described in Example 1 using a reduced level of GMA (4% based on the base resin) without the Nacure catalyst. The resin was found to have an improved stability over the alkyd resin (1) when no stabilizers were used in both resins.

In order to verify the effectiveness of IOMP as the stabilizer for acrylate-functional alkyd resins, a ladder study was carried out using various levels (250 ppm, 500 ppm, 1000 ppm, and 2000 ppm) of IOMP. Samples were prepared by adding IOMP (20% in mineral spirits) to the alkyd resin (3) (1651 g, 96.9% solids) at 121° C. An extra amount of mineral spirits was added to each sample to adjust the % solids to 96%. Each mixture was then stirred at 121° C. for 20 minutes, allowed to cool to 60° C., and subsequently collected. The samples were stored in an oven at 50° C. over eight weeks; during which time, their molecular weights and Brookfield viscosities were monitored. The results are listed in Tables 5 and 6. To reduce experimental errors, each level of the samples was studied in triplicate.

7. Based on the results from this study, a level of 300-600 ppm appears to be the most suitable ratio to be used for IOMP as the resin stabilizer. Set to touch dry time (SST): The coating is considered set to touch when it is touched gently by the fingers and no paint is transferred.

TABLE 7

Paint Set-to-Touch (STT) Time

| Paint Sample | STT 1 Day | STT 2 weeks | STT 9 weeks |
|---|---|---|---|
| control | 2:15 | 2:00 | 1:50 |
| 250 ppm IOMP | 2:15 | 2:00 | 1:50 |
| 500 ppm IOMP | 2:15 | 2:00 | 1:50 |
| 1000 ppm IOMP | 2:30 | 2:15 | 2:15 |
| 2000 ppm IOMP | 2:30 | 2:15 | 2:30 |

TABLE 5

Resin Molecular Weights over Time at 50° C. with Various IOMP Levels

| Sample | Mw Initial | Mw 1 Wk | Mw 2 Wk | Mw 3 Wk | Mw 4 Wk | Mw 7 Wk | Mw 8 Wk |
|---|---|---|---|---|---|---|---|
| control | 10,818 | 11,520 | 14,673 | 19,099 | 23,967 | 44,452 | 48,594 |
| control | 11,342 | 11,316 | 14,741 | 17,802 | 24,022 | 39,995 | 40,804 |
| control | 10,353 | 11,053 | 14,437 | 17,629 | 22,679 | 34,961 | 38,916 |
| 250 ppm IOMP | 10,357 | 11,469 | 24,887 | 21,259 | 21,206 | 24,637 | 23,979 |
| 250 ppm IOMP | 10,009 | 11,478 | 14,850 | 19,693 | 19,318 | 22,599 | 21,647 |
| 250 ppm IOMP | 10,385 | 10,649 | 13,141 | 14,695 | 15,956 | 17,764 | 17,053 |
| 500 ppm IOMP | 10,514 | 10,635 | 11,004 | 12,404 | 11,151 | 11,959 | 11,856 |
| 500 ppm IOMP | 10,599 | 11,028 | 15,978 | 17,455 | 17,271 | 17,854 | 19,019 |
| 500 ppm IOMP | 10,059 | 10,476 | 12,853 | 15,373 | 13,867 | 15,619 | 16,762 |
| 1000 ppm IOMP | 10,242 | 10,218 | 15,926 | 17,378 | 12,292 | 12,956 | 11,606 |
| 1000 ppm IOMP | 10,608 | 10,677 | 13,209 | 18,203 | 14,044 | 16,302 | 13,861 |
| 1000 ppm IOMP | 10,066 | 10,017 | 13,044 | 17,820 | 23,763 | 21,857 | 17,322 |
| 2000 ppm IOMP | 10,344 | 10,366 | 10,709 | 10,514 | 14,731 | 13,003 | 10,671 |
| 2000 ppm IOMP | 10,031 | 10,896 | 10,835 | 11,893 | 11,596 | 12,649 | 11,166 |
| 2000 ppm IOMP | 12,240 | 12,536 | 12,229 | 12,604 | 13,164 | 15,288 | 13,279 |

TABLE 6

Resin Brookfield Viscosity (cP) over Time at 50° C. with Various IOMP Levels

| Sample | Viscosity Initial | Vis. 1 wk | Vis. 2 wk | Vis. 3 wk | Vis. 4 wk | Vis. 7 wk | Vis. 8 wk |
|---|---|---|---|---|---|---|---|
| control | 5,400 | 6,200 | 6,700 | 8,100 | 9,700 | 15,600 | 16,400 |
| control | 6,000 | 5,900 | 6,700 | 7,700 | 8,600 | 15,600 | 16,800 |
| control | 5,900 | 6,000 | 6,200 | 7,800 | 8,800 | 15,600 | 16,600 |
| 250 ppm IOMP | 6,000 | 6,100 | 6,900 | 8,300 | 8,900 | 9,100 | 9,100 |
| 250 ppm IOMP | 6,000 | 5,800 | 6,500 | 7,300 | 7,800 | 8,600 | 8,600 |
| 250 ppm IOMP | 6,000 | 5,700 | 6,600 | 7,000 | 6,500 | 6,000 | 6,700 |
| 500 ppm IOMP | 6,200 | 5,700 | 5,900 | 6,000 | 6,400 | 5,700 | 6,400 |
| 500 ppm IOMP | 6,400 | 5,900 | 6,300 | 8,000 | 7,300 | 7,600 | 7,900 |
| 500 ppm IOMP | 6,400 | 5,600 | 5,900 | 6,100 | 6,400 | 6,700 | 7,000 |
| 1000 ppm IOMP | 6,400 | 6,100 | 5,800 | 6,500 | 6,100 | 6,000 | 5,900 |
| 1000 ppm IOMP | 6,400 | 6,500 | 6,100 | 6,500 | 6,700 | 6,500 | 7,000 |
| 1000 ppm IOMP | 6,200 | 6,100 | 6,300 | 6,600 | 6,600 | 6,900 | 8,500 |
| 2000 ppm IOMP | 5,500 | 5,800 | 5,800 | 5,500 | 5,800 | 5,700 | 5,700 |
| 2000 ppm IOMP | 6,000 | 6,400 | 5,900 | 5,600 | 5,600 | 6,000 | 6,000 |
| 2000 ppm IOMP | 6,300 | 6,300 | 6,100 | 5,800 | 6,500 | 6,600 | 6,400 |

As illustrated in Tables 5 and 6, all levels of IOMP had positive effects on the resin stability over time; the effects were most distinct after four weeks at 50° C. In general, the more IOMP was used, the better was the resin stability. However, higher levels of IOMP could result in longer set-to-touch (STT) times of the paints, as indicated in Table Residual GMA of the acrylate-functional alkyd resin (3) was analyzed by Gas Chromatography before and after the addition of IOMP. The results were: 148 ppm (before); 137 ppm (after adding 250 ppm IOMP); 126 ppm (after adding 500 ppm IOMP); 145 ppm (after adding 1000 ppm); and 154 ppm (after adding 2000 ppm IOMP). These results indicated that there was no appreciable reaction between the residual GMA and the mercaptan under the mixing conditions.

Example 5

Preparation of Paint Formulation

The following materials were ground together using a high-speed mixer: acrylate-functional alkyd resin (3) (73.96 g; 96.9% solids), Mineral Spirits Rule 66 (110.94 g), Bentone SD-1 (ELEMENTIS) (9.62 g), Yelkin TS Soya Lecithin (ADM Speciality) (1.85 g), Nuosperse 657 (Condea Servo) (2.77 g), Irocthix 2000 (Lubrizol) (9.24 g), TiPure R-706 (Dupont) (249.62 g), and Barytes UF (Cimbar) (69.34 g). The resulting ground material was mixed with the following materials: acrylate-functional alkyd resin (3) (397.54 g), Mineral Spirits Rule 66 (41.6 g), 12% Cobalt Ten-Cem (OMG) (2.59 g), 5% Calcium Ten-Cem (OMG) (55.47 g), and Exkin #2 anti-skinning agent (Condea Servo) (1.85 g) to give a white paint formulation.

The invention has been described in detail with particular reference to preferred embodiments thereof, but it will be understood that variations and modifications can be effected within the spirit and scope of the invention. In the specification, there have been disclosed preferred embodiments of the invention and, although specific terms are employed, they are used in a generic and descriptive sense only and not for purposes of limitation, the scope of the invention being set forth in the following claims.

We claim:

1. An alkyd resin composition, comprising:
 (I) an acrylate-functional alkyd resin; and
 (II) from about 100 ppm to about 2000 ppm, based on the acrylate-functional alkyd resin, of a monofunctional mercaptan.

2. The alkyd resin composition of claim 1, wherein the monofunctional mercaptan comprises one or more of: isooctyl 3-mercaptopropionate, n-dodecyl mercaptan, t-dodecyl mercaptan, or n-butyl 3-mercaptopropionate.

3. The alkyd resin composition of claim 1, wherein the monofunctional mercaptan comprises isooctyl 3-mercaptopropionate.

4. The alkyd resin composition of claim 1, wherein the acrylate-functional alkyd resin comprises the reaction product of:
 (i) a carboxyl-functional alkyd resin, and
 (ii) a glycidyl acrylate, wherein the glycidyl moiety of the glycidyl acrylate is the reactive moiety and the reaction product contains terminal reactive acrylate moieties.

5. The alkyd resin composition of claim 1, wherein the acrylate-functional alkyd resin comprises the reaction product of:
 (i) about 85 to about 98 wt % of a carboxyl-functional alkyd resin; and
 (ii) about 2 to about 15 wt % of a glycidyl acrylate, wherein the weight percents are based on the total weight of (i) and (ii), and wherein the glycidyl moiety of the glycidyl acrylate is the reactive moiety and the reaction product contains terminal reactive acrylate moieties.

6. The alkyd resin composition of claim 5, wherein the monofunctional mercaptan comprises isooctyl 3-mercaptopropionate.

7. The alkyd resin composition of claim 4, wherein the carboxyl-functional alkyd resin comprises the reaction product of:
 (a) from 0 to about 30 mole % of a diol;
 (b) from about 10 to about 40 mole % of a polyol;
 (c) from about 20 to about 40 mole % of a polyacid;
 (d) from 0 to about 10 mole % of a monofunctional acid; and
 (e) from about 10 to about 60 mole % of a fatty acid, a fatty ester, or a naturally occurring oil,
 wherein the mole percents are based on the total moles of (a), (b), (c), (d), and (e).

8. The alkyd resin composition of claim 7, wherein the diol comprises neopentyl glycol; the polyol comprises one or more of trimethylolpropane or pentaerythritol; the polyacid comprises one or more of isophthalic acid or phthalic anhydride; and the naturally occurring oil or fatty acid comprises one or more of soybean oil, sunflower oil, or tall oil fatty acid.

9. The alkyd resin composition of claim 4, wherein the carboxyl-functional alkyd resin comprises the reaction product of:
 (a) from 0 to about 30 mole % of a diol;
 (b) from about 10 to about 40 mole % of a polyol;
 (c) from about 20 to about 40 mole % of a polyacid;
 (d) from 0 to about 10 mole % of a monofunctional acid;
 (e) from about 10 to about 60 mole % of a fatty acid, a fatty ester, or a naturally occurring oil; and
 (f) from about 2 to about 10 mole % of a sulfomonomer, wherein the mole percents are based on the total moles of (a), (b), (c), (d), (e), and (f).

10. The storage-stable alkyd resin composition of claim 9, wherein the sulfomonomer comprises 5-sodiosulfoisophthalic acid.

11. The storage-stable alkyd resin composition of claim 4, wherein the glycidyl acrylate comprises glycidyl methacrylate.

12. The alkyd resin composition of claim 1, wherein the composition further comprises from about 10 to about 90 wt % of an alkyd resin lacking aerylate functionality, based on the total weight of the acrylate-functional alkyd resin and the alkyd resin lacking acrylate functionality.

13. The alkyd resin composition of claim 4, wherein the composition further comprises from about 10 to about 90 wt % of an alkyd resin lacking acrylate functionality, based on the total weight of the acrylate-functional alkyd resin and the alkyd resin lacking acrylate functionality.

14. An ambient oxidative-cure composition, comprising:
 (a) an alkyd resin composition that includes
 (I) an acrylate-functional alkyd resin, and
 (II) from about 100 ppm to about 2000 ppm, based on the acrylate-functional alkyd resin, of a monofunctional mercaptan;
 (b) at least one drier; and
 (c) a solvent selected from the group consisting of an organic solvent, water, and mixtures thereof.

15. The ambient oxidative-cure composition of claim 14, wherein the solvent comprises at least one organic solvent.

16. The ambient oxidative-cure composition of claim 14, wherein the acrylate-functional alkyd resin comprises the reaction product of:
 (i) a carboxyl-functional alkyd resin; and
 (ii) a glycidyl acrylate,
 wherein the glycidyl moiety of the glycidyl acrylate is the reactive moiety and the reaction product contains terminal reactive acrylate moieties.

17. The ambient oxidative-cure composition of claim 14, wherein the acrylate-functional alkyd resin comprises the reaction product of:
 (i) about 85 to about 98 wt % of a carboxyl-functional alkyd resin; and (ii) about 2 to about 15 wt % of the glycidyl acrylate, wherein the weight percents are based on the total weight of (i) and (ii), and wherein the glycidyl moiety of the glycidyl acrylate is the reactive moiety and the reaction product contains terminal reactive acrylate moieties.

18. The ambient oxidative-cure composition of claim 14, wherein:
the storage-stable alkyd resin composition of (a) is present in an amount of from about 30 to about 98 wt %, based on the total composition;
the drier of (b) is present in an amount of from about 0.01 to about 5.0 wt % of metal, based on the total composition; and
the solvent of (c) is present in an amount of from about 1 to about 70 wt %, based on the total composition.

19. The ambient oxidative-cure composition of claim 16, wherein the carboxyl-functional alkyd resin comprises the reaction product of:
(a) from 0 to about 30 mole of a diol;
(b) from about 10 to about 40 mole % of a polyol;
(c) from about 20 to about 40 mole % of a polyacid;
(d) from 0 to about 10 mole % of a monofunctional acid; and
(e) from about 10 to about 60 mole % of a fatty acid, a fatty ester, or a naturally occurring oil, wherein the mole percents are based on the total moles of (a), (b), (c), (d), and (e).

20. The ambient oxidative-cure composition of claim 19, wherein the diol comprises neopentyl glycol; the polyol comprises one or more of trimethylolpropane or pentaerythritol; the polyacid comprises one or more of isophthalic acid or phthalic anhydride; and the naturally occurring oil or fatty acid comprises one or more of soybean oil, sunflower oil, or tall oil fatty acid.

21. The ambient oxidative-cure composition of claim 16, wherein the carboxyl-functional alkyd resin comprises the reaction product of:
(a) from 0 to about 30 mole % of a diol;
(b) from about 10 to about 40 mole % of a polyol;
(c) from about 20 to about 40 mole % of a polyacid;
(d) from 0 to about 10 mole % of a monofunctional acid;
(e) from about 10 to about 60 mole % of a fatty acid, a fatty ester, or a naturally occurring oil; and
(f) from about 2 to about 10 mole % of a sulfomonomer, wherein the mole percents are based on the total moles of (a), (b), (c), (d), (e), and (f).

22. The ambient oxidative-cure composition of claim 21, wherein the sulfomonomer comprises 5-sodiosulfoisophthalic acid.

23. The ambient oxidative-cure composition of claim 16, wherein the glycidyl acrylate comprises glycidyl methacrylate.

24. The ambient oxidative-cure composition of claim 14, wherein the composition further comprises from about 10 to about 90 wt % of an alkyd resin lacking acrylate functionality, based on the total weight of the acrylate-functional alkyd resin and the alkyd resin lacking acrylate functionality.

25. The ambient oxidative-cure composition of claim 16, wherein the composition further comprises from about 10 to about 90 wt % of an alkyd resin lacking acrylate functionality, based on the total weight of the acrylate-functional alkyd resin and the alkyd resin lacking acrylate functionality.

26. The ambient oxidative-cure composition of claim 14, further comprising a surfactant.

27. The ambient oxidative-cure composition of claim 14, further comprising an amine.

28. The ambient oxidative-cure composition of claim 14, further comprising one or more of: a flow control agent, an extender, a plasticizer, a flatting agent, a pigment wetting agent, a pigment dispersing agent, an ultraviolet light absorber, an ultraviolet light stabilizer, a tinting pigment, a colorant, a defoaming agent, an antifoaming agent an anti-settling agent, an anti-sag agent, a bodying agent, an anti-skinning agent, an anti-flooding agent, an anti-floating agent, or a corrosion inhibitor.

29. A method of improving the storage stability of an acrylate-functional alkyd resin composition, comprising adding to the resin composition from about 100 ppm to about 2000 ppm, based on the acrylate-functional alkyd resin, of a monofunctional mercaptan.

30. The method of claim 29, wherein the monofunctional mercaptan comprises one or more of: isooctyl 3-mercaptopropionate, n-dodecyl mercaptan, t-dodecyl mercaptan, or n-butyl 3-mercaptopropionate.

31. The method of claim 29, wherein the monofunctional mercaptan comprises isooctyl 3-mercaptopropionate.

32. The method of claim 29, wherein the acrylate-functional alkyd resin comprises the reaction product of:
(i) a carboxyl-functional alkyd resin, and
(ii) a glycidyl acrylate, wherein the glycidyl moiety of the glycidyl acrylate is the reactive moiety and the reaction product contains terminal reactive acrylate moieties.

33. The method of claim 29, wherein the acrylate-functional alkyd resin comprises the reaction product of:
(i) about 85 to about 98 wt % of a carboxyl-functional alkyd resin; and
(ii) about 2 to about 15 wt % of a glycidyl acrylate, wherein the weight percents are based on the total weight of (i) and (ii), and wherein the glycidyl moiety of the glycidyl acrylate is the reactive moiety and the reaction product contains terminal reactive acrylate moieties.

34. The method of claim 33, wherein the monofunctional mercaptan comprises isooctyl 3-mercaptopropionate.

35. The method of claim 32, wherein the carboxyl-functional alkyd resin comprises the reaction product of:
(a) from 0 to about 30 mole % of a diol;
(b) from about 10 to about 40 mole % of a polyol;
(c) from about 20 to about 40 mole % of a polyacid;
(d) from 0 to about 10 mole % of a monofunctional acid; and
(e) from about 10 to about 60 mole % of a fatty acid, a fatty ester, or a naturally occurring oil,
wherein the mole percents are based on the total moles of (a), (b), (c), (d), and (e).

36. The method of claim 35, wherein the diol comprises neopentyl glycol; the polyol comprises one or more of trimethylolpropane or pentaerythritol; the polyacid comprises one or more of isophthalic acid or phthalic anhydride; and the naturally occurring oil or fatty acid comprises one or more of soybean oil, sunflower oil, or tall oil fatty acid.

37. The method of claim 32, wherein the carboxyl-functional alkyd resin comprises the reaction product of:
(a) from 0 to about 30 mole % of a diol;
(b) from about 10 to about 40 mole % of a polyol;
(c) from about 20 to about 40 mole % of a polyacid;
(d) from 0 to about 10 mole % of a monofunctional acid;
(e) from about 10 to about 60 mole % of a fatty acid, a fatty ester, or a naturally occurring oil; and
(f) from about 2 to about 10 mole % of a sulfomonomer, wherein the mole percents are based on the total moles of (a), (b), (c), (d), (e), and (f).

38. The method of claim 37, wherein the sulfomonomer comprises 5-sodiosulfoisophthalic acid.

39. The method of claim 32, wherein the glycidyl acrylate comprises glycidyl methacrylate.

40. A method of preparing an ambient oxidative-cure composition, comprising combining:
  (a) an alkyd resin composition that includes
    (I) an acrylate-functional alkyd resin, and
    (II) from about 100 ppm to about 2000 ppm, based on the acrylate-functional alkyd resin, of a monofunctional mercaptan;
  (b) at least one drier; and
  (c) a solvent selected from the group consisting of an organic solvent, water, and mixtures thereof.

41. The method of claim 40, wherein the solvent comprises at least one organic solvent.

42. The method of claim 40, wherein the acrylate-functional alkyd resin comprises the reaction product of:
  (i) a carboxyl-functional alkyd resin; and
  (ii) a glycidyl acrylate,
wherein the glycidyl moiety of the glycidyl acrylate is the reactive moiety and the reaction product contains terminal reactive acrylate moieties.

43. The method of claim 40, wherein the acrylate-functional alkyd resin comprises the reaction product of:
  (i) about 85 to about 98 wt % of a carboxyl-functional alkyd resin; and
  (ii) about 2 to about 15 wt % of the glycidyl acrylate, wherein the weight percents are based on the total weight of (i) and (ii), and wherein the glycidyl moiety of the glycidyl acrylate is the reactive moiety and the reaction product contains terminal reactive acrylate moieties.

44. The method of claim 40, wherein:
  the storage-stable alkyd resin composition of (a) is present in an amount of from about 30 to about 98 wt %, based on the total composition;
  the drier of (b) is present in an amount of from about 0.01 to about 5.0 wt % of metal, based on the total composition; and
  the solvent of (c) is present in an amount of from about 1 to about 70 wt %, based on the total composition.

45. A method of preparing a storage-stable acrylate-functional alkyd resin composition, comprising the steps of:
  reacting (i) a carboxyl-functional alkyd resin, and (ii) a glycidyl acrylate, wherein the glycidyl moiety of the glycidyl acrylate is the reactive moiety and the reaction product contains terminal reactive acrylate moieties, to obtain an acrylate-functional alkyd resin; and
  adding to the acrylate-functional alkyd resin:
    a) at least one drier,
    b) a solvent selected from the group consisting of an organic solvent, water, and mixtures thereof, and
    c) from about 100 ppm to about 2000 ppm, based on the acrylate-functional alkyd resin, of a monofunctional mercaptan, to obtain the storage-stable acrylate-functional alkyd resin composition.

46. The method of claim 45, wherein the monofunctional mercaptan comprises one or more of: isooctyl 3-mercaptopropionate, n-dodecyl mercaptan, t-dodecyl mercaptan, or n-butyl 3-mercaptopropionate.

47. The method of claim 45, wherein the monofunctional mercaptan comprises isooctyl 3-mercaptopropionate.

48. The method of claim 45, wherein the carboxyl-functional alkyd resin is provided in an amount from about 85 to about 98 wt % of a carboxyl-functional alkyd resin; and the glycidyl acrylate is provided in an amount from about 2 to about 15 wt %, wherein the weight percents are based on the total weight of (i) and (ii).

49. The method of claim 45, wherein the carboxyl-functional alkyd resin comprises the reaction product of:
  (a) from 0 to about 30 mole % of a diol;
  (b) from about 10 to about 40 mole % of a polyol;
  (c) from about 20 to about 40 mole % of a polyacid;
  (d) from 0 to about 10 mole % of a monofunctional acid; and
  (e) from about 10 to about 60 mole % of a fatty acid, a fatty ester, or a naturally occurring oil,
  wherein the mole percents are based on the total moles of (a), (b), (c), (d), and (e).

50. The method of claim 49, wherein the diol comprises neopentyl glycol; the polyol comprises one or more of trimethylolpropane or pentaerythritol; the polyacid comprises one or more of isophthalic acid or phthalic anhydride; and the naturally occurring oil or fatty acid comprises one or more of soybean oil, sunflower oil, or tall oil fatty acid.

51. The method of claim 45, wherein the carboxyl-functional alkyd resin comprises the reaction product of:
  (a) from 0 to about 30 mole % of a diol;
  (b) from about 10 to about 40 mole % of a polyol;
  (c) from about 20 to about 40 mole % of a polyacid;
  (d) from 0 to about 10 mole % of a monofunctional acid;
  (e) from about 10 to about 60 mole % of a fatty acid, a fatty ester, or a naturally occurring oil; and
  (f) from about 2 to about 10 mole % of a sulfomonomer,
  wherein the mole percents are based or the total moles of (a), (b), (c), (d), (e), and (f).

52. The method of claim 51, wherein the sulfomonomer comprises 5-sodiosulfoisophthalic acid.

53. The method of claim 45, wherein the glycidyl acrylate comprises glycidyl methacrylate.

* * * * *